May 10, 1932.                R. W. McAFEE                1,858,101
            SEALING BOX, BRACE, AND LINER FOR UNDERGROUND PIPES
                           Filed Aug. 27, 1928
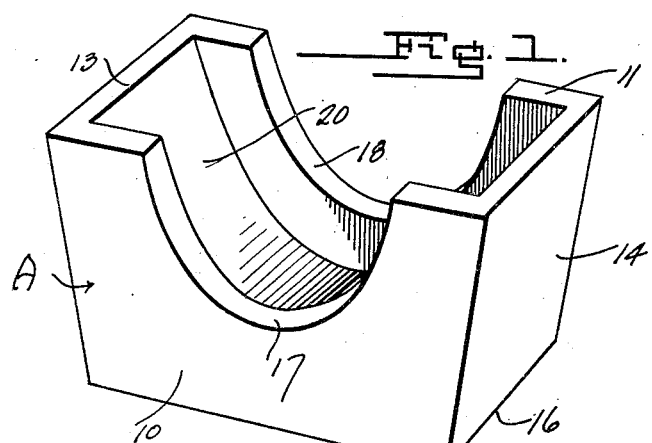
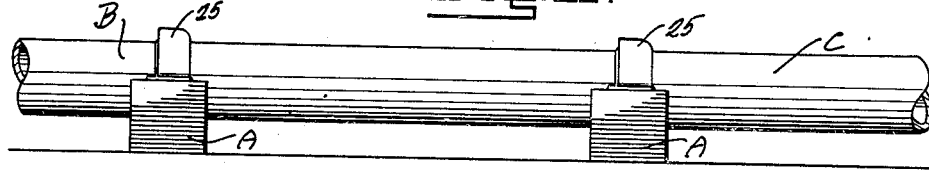
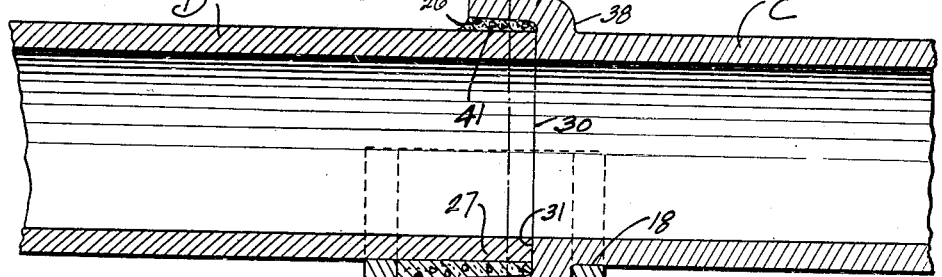
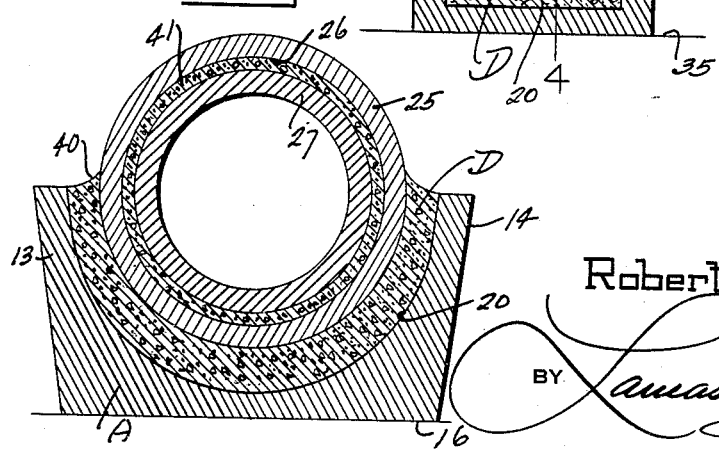
INVENTOR.
Robert W. McAfee,
BY Lamaster and Allwine
ATTORNEYS.

Patented May 10, 1932

1,858,101

UNITED STATES PATENT OFFICE

ROBERT W. McAFEE, OF ATLANTA, GEORGIA

SEALING BOX, BRACE, AND LINER FOR UNDERGROUND PIPES

Application filed August 27, 1928. Serial No. 302,408.

This invention relates to improvements in means for efficiently supporting, bracing, aligning, and sealing the sections of pipe.

The primary object of this invention is the provision of an improved device, which may be used at the joint of pipes, such as drain pipes, to efficiently support the same in place and permit the joint to be thoroughly and hermetically sealed, so that roots cannot penetrate the joint.

A further and important object of this invention is the provision of an improved box-like support which may be used at the joints of ordinary drain pipe, to efficiently support and align the sections of the drain pipe, so that a mortar seal may be provided in an efficient and accurate relation, even by unskilled labor, to provide a drain conduit which is hermetically sealed from end to end, and into which roots of hedges, trees and shrubbery cannot penetrate; thus doing away with clogging of drain pipes and the unsanitary collection of foul water and deposits.

Another object of the invention is to provide boxlike supports which may be easily placed to support and align the pipe sections and subsequently used to receive the sealing material such as cement used in hermetically sealing the pipe line, all of which may be accomplished without the necessity of digging wide trenches or enlargements in the trenches where joints occur. This is of much importance from at time saving and economical standpoint for with the present common method of laying and sealing pipes, it is often necessary to make the trenches wide enough to permit men to enter and calk or work with tools in and about the joints,—operations requiring considerable elbow room if satisfactory jobs are to be accomplished. By use of my present invention the trenches may be relatively narrow for a person does not have to reach down and around the pipe section in order to seal the joints and a person may accomplish much of the placing and inspection from directly above the pipe line.

Other objects and advantages of this invention will be apparent during the course of the following detailed description, In the accompanying drawings, forming a part of this specification, and wherein similar reference characters designate corresponding parts throughout the several views, Figure 1 is a perspective view of the improved box, adapted to support both pipe sections at a joint in an efficient relation.

Figure 2 shows the use of the improved sealing box at the joints of pipe sections.

Figure 3 is a sectional view taken through the improved box, longitudinally of the pipe sections, showing the manner in which it supports the pipe sections for receiving mortar or other sealing bond in an efficient relation.

Figure 4 is a sectional view taken substantially on the line 4—4 of Figure 3.

In the drawings, wherein for the purpose of illustration is shown only a preferred embodiment of the invention, the letter A may generally designate the improved supporting box, which may be used at the joints of pipe sections B and C for properly supporting, bracing, and aligning said sections so that the box and the joint at the pipe section may receive a cementitious seal D.

The box A is preferably made of cast concrete, although it may be made of iron, clay, or any approved metal or material. In the preferred construction it includes the pipe supporting walls 10 and 11, which are preferably parallel, and connected by the end walls 13 and 14; said end walls preferably tapering slightly at their outer surfaces in planes which diverge upwardly from the bottom 16 of the box.

For ordinary pipe sections, the walls 10 and 11 are provided with concave seats 17 and 18 respectively, each preferably struck from the axial center, and each seat comprising substantially a half circle, so that the pipe sections B and C may seat respectively therein throughout substantially half the circumference thereof, as is shown in Figures 3 and 4 of the drawings. The material of which the box is formed is filled into the box between the end walls 13 and 14 to provide a concave surface 20, which extends from the top edge of the wall 13 downwardly along the bottom of the box and up to the top edge of the wall 13; the surface 20 being preferably concentric with the center from which the seats 17 and 18 are struck. In this way the walls 13 and 14 increase in thickness from the top edges thereof downwardly to the center of the bottom 16 between said end walls. This is well shown in Figure 4 of the drawings, and can best be described by stating that the inside of the box at the junctures of the end walls 13 and 14 with the bottom wall 16 are provided with fillets in order to shape the bottom inside surface 20 in a concentric relation with the pipe, which it is adapted to support. Of course, the surface 20, while struck from the same axial center as the seats 17 and 18, is of greater radius.

The pipe sections B and C may vary in shape and size, and the joints forming ends thereof may be of various shapes and forms, depending upon the character and use of pipe. Merely by way of illustration, the drawings show ordinary drain pipe sections B and C, with the pipe section C provided with an enlarged bell flange 25, having a socket 26 wherein the spigot or straight end 27 of the pipe section B is adapted to fit in a circumferential spaced relation between the outer periphery of the spigot end 27 and the inner periphery of the socket wall, to receive a sealing material. Of course, the end edge 30 of the pipe section B fits against the shoulder 31, provided therefor at the juncture of the bell flange 25, with the body of the pipe section C, as shown in Figure 3.

As to the installation of the improved device, the supporting box A is placed at the desired level upon the ground, or other foundation; the bottom flat surface 16 thereof supporting the box A in a stable position upon the foundation surface 35, as shown in Figures 2, 3 and 4 of the drawings. The pipe sections B and C are initially assembled with the spigot end 27 in the bell flange 25, and they are then respectively placed near their joint connection in the seats 17 and 18 of the box walls 10 and 11, as shown in Figure 3 of the drawings, with the spigot and bell ends of said pipe sections within the plane of the compartment of said box A. In this position of parts it is to be noted from Figure 4 that the segmental compartment between the outer peripheral surfaces which face the bottom 20, is open at diametrically opposed sides at the joint of the pipes, adjacent walls 13 and 14, to permit the filling of mortar or other sealing material therein.

In the assemblage the outer shoulder 38 at the juncture of the bell flange 25 with the body of the pipe section C, abuts against the inner surface of the wall 11 about the seat 18, and this anchors the pipe section C against longitudinal movement away from the box A in the direction of the wall 11. The spigot flange or end 27 of course seats in the bell flange 25, in the relation shown in Figure 3, and the boxes A are installed at a plurality of joints on the pipe sections of the conduit being laid, and thus the conduit sections are held in proper alignment, so that the spigot ends of the pipe sections do not rest for their support upon the bell flanges 25. That is to say, the ends of the pipe sections B and C at the joints thereof are directly supported by the walls 10 and 11 of the supporting boxes A, and the weight of the pipe sections at the joints thereof are not placed on any parts of the joint. This provides an annular space of uniform cross section between the outer periphery of the spigot end of the pipe section B and the inner periphery of the bell flange of the pipe section C, so that a mortar or other bond may be placed therein in an efficient relation, as can readily be understood by those skilled in the art to which this invention relates.

With the pipe sections B and C supported at their joint ends upon the supporting box A, the cementitious material is poured into the box, which may be referred to as a mortar box, in event the same is to receive cementitious material, and the cementitious material is forced into the openings at diametrically opposed sides of the joint of the pipe sections, and the mortar box is filled, as shown in Figure 3; the cementitious material entering the annular space between the bell and spigot ends, at the joint of the pipe sections B, and C, and completely filling the same. In fact, the bell flange is entirely embedded in cementitious material, at both sides thereof, for substantially one-half the circumference thereof, that is, from the top edge of the wall 13 to the top edge of the wall 14, and thus the lower one-half of the joint of the pipes B and C is entirely embedded in cementitious material, providing an efficient seal, through which roots cannot find an entering wedge, and from which liquids cannot seep, due to the hermetic seal. Of course, the upper half of the joint is provided by filling the segmental space between the spigot and bell flanges of the pipe sections B and C, with a mortar bond, which bonds at the ends thereof with the mortar seal provided by forcing the cementitious material into the box A at opposite sides of the joint of the pipe. As is shown in Figure 4 of the drawings, the cementitious seal D extends throughout the arc provided between the facing peripheries of the pipe sections at the joints thereof, and the surface 20 of the box A, from the top edge of the wall 13 to the top edge of the wall 14, being rounded in sloping relation with the periphery of the pipe sections, as shown at 40 in Figure 4 of the drawings. The annular seal 41 between the outer periphery of the spigot end of the flange and the inner periphery of the bell end of the flange is uniform in section throughout the circumference of the joint of the pipe, as shown in Figure 4 of the drawings, and of course has a bond with the material D in the box A, as shown in Figure 3.

It is considered entirely feasible that the improved supporting box may be of suitable material which will receive molten lead, so that the pipe sections, where the condition requires, may be filled with lead or the like. If desired, a cover similar to the box A may be placed at the top half of the joint, although such is considered not necessary.

It will be apparent from the foregoing, that the improved supporting box acts as a brace or stay in supporting the pipe in alignment, so that the flanges or ends at the joint of the pipe will be held in a proper relation to receive an efficient seal. It is impossible to get sufficient mortar at the under part of the joint, by hand alone, where the pipe sections rest in engagement with each other, as drain pipes are conventionally installed. However, the improved supporting box will hold the pipe sections in alignment, so that unskilled labor can quickly and economically align the pipes and fill the box with mortar, and provides an efficient cementitious seal. In addition to the box A, the cementitious seal throughout the lower circumferential half of the pipe joint will absolutely insure that no roots or other underground growing vegetation will penetrate the joint, so as to cause a clog within the passageway of the aligning pipes. While I am aware that it has heretofore been proposed to provide means to quickly fill the joint space between pipes, such means is not adaptable for installation as a permanent part of the joint, resting on the foundation, for initially aligning the pipes in the desired relation.

Mention is made also of the use of the supporting boxes to prevent creeping of pipe lines which are placed on an incline, for the side walls 10 and 11 act as ample abutments against the soil in which they are finally embedded to prevent creeping or at least to resist creeping to a greater degree than would the shoulders 38 of the bell flanges 25 alone.

It is obvious also that it does not require a very wide trench in which to place the boxes and pipe sections in proper assembled relation, nor to work the sealing material into the joints, for a person does not have to reach under the pipe sections in order to effect the seal. Hence the cost and time required to place the pipe line for use is reduced to a minimum.

Various changes in the shape, size, and arrangement of parts may be made to the form of invention herein shown and described, without departing from the spirit of the invention or the scope of the claim.

I claim:

As an article of manufacture a mortar box of the class described comprising spaced side walls provided with pipe seating recesses thereon, and end walls connecting the ends of said side walls with their outer surfaces diverging upwardly, the box being open at the top thereof, and the seats on said walls opening at the top of said box.

ROBERT W. McAFEE.